(12) United States Patent
Bezel et al.

(10) Patent No.: US 8,698,399 B2
(45) Date of Patent: Apr. 15, 2014

(54) MULTI-WAVELENGTH PUMPING TO SUSTAIN HOT PLASMA

(75) Inventors: Ilya V. Bezel, Sunnyvale, CA (US); Anatoly Shchemelinin, Pleasanton, CA (US); Eugene Shifrin, Sunnyvale, CA (US); Matthew W. Derstine, Los Gatos, CA (US); Richard W. Solarz, Danville, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 96 days.

(21) Appl. No.: 13/119,491

(22) PCT Filed: Feb. 12, 2010

(86) PCT No.: PCT/US2010/024074
§ 371 (c)(1),
(2), (4) Date: Mar. 17, 2011

(87) PCT Pub. No.: WO2010/093903
PCT Pub. Date: Aug. 19, 2010

(65) Prior Publication Data
US 2011/0291566 A1   Dec. 1, 2011

Related U.S. Application Data

(60) Provisional application No. 61/152,578, filed on Feb. 13, 2009.

(51) Int. Cl.
*H05H 1/24* (2006.01)
(52) U.S. Cl.
USPC ............ 315/111.21; 315/111.71; 315/111.91; 359/326; 359/330; 359/332; 372/25; 372/18

(58) Field of Classification Search
USPC .......... 359/326, 328, 330, 332; 372/2, 21, 22, 372/18, 25, 13, 30, 31, 35, 64, 70, 87; 315/111.21, 111.71, 111.91
See application file for complete search history.

(56) References Cited

U.S. PATENT DOCUMENTS

| | | | |
|---|---|---|---|
| 3,900,803 A | | 8/1975 | Silfvast et al. |
| 5,790,574 A | * | 8/1998 | Rieger et al. ............ 372/25 |

(Continued)

FOREIGN PATENT DOCUMENTS

| | | |
|---|---|---|
| EP | 0858249 | 4/2003 |
| JP | 62-145790 A | 6/1987 |
| WO | 2005089131 | 9/2005 |

OTHER PUBLICATIONS

M. Ghotbi et al., "Optical Second Harmonic Generation Properties of BiB3O6," Opt. Express, Nov. 2004, vol. 12, No. 24. Nov. 29, 2004.

*Primary Examiner* — Vibol Tan
(74) *Attorney, Agent, or Firm* — Leudeka Neely Group, P.C.; Rick Barnes

(57) ABSTRACT

A method of sustaining a plasma, by focusing a first wavelength of electromagnetic radiation into a gas within a volume, where the first wavelength is substantially absorbed by a first species of the gas and delivers energy into a first region of a plasma having a first size and a first temperature. A second wavelength of electromagnetic radiation is focused into the first region of the plasma, where the second wavelength is different than the first wavelength and is substantially absorbed by a second species of the gas and delivers energy into a second region of the plasma region within the first region of the plasma having a second size that is smaller than the first size and a second temperature that is greater than the first temperature.

19 Claims, 3 Drawing Sheets

(56) References Cited

U.S. PATENT DOCUMENTS

| | | | |
|---|---|---|---|
| 6,151,155 A * | 11/2000 | Durfee et al. | 359/332 |
| 6,370,178 B1 * | 4/2002 | Papayoanou et al. | 372/64 |
| 6,525,868 B2 * | 2/2003 | Merriam et al. | 359/326 |
| 7,627,007 B1 * | 12/2009 | Armstrong et al. | 372/21 |
| 7,642,205 B2 * | 1/2010 | Timans | 438/795 |
| 2002/0093653 A1 | 7/2002 | Detalle et al. | |
| 2004/0155207 A1 * | 8/2004 | Kleinschmidt | 250/504 R |
| 2007/0158594 A1 | 7/2007 | Shirai et al. | |

* cited by examiner

MULTI-WAVELENGTH PUMPING TO SUSTAIN HOT PLASMA

FIELD

This application claims all rights and priority on U.S. provisional patent application Ser. No. 61/152,578 filed Feb. 13, 2009 and PCT patent application serial number US2010/024074 filed Feb. 12, 2010. This invention relates to the field of plasma light sources. More particularly, this invention relates to increasing the brightness of plasma light sources.

INTRODUCTION

The desire for integrated circuits having ever-higher transistor densities tends to drive a need in the industry to reduce the size of the structures from which those integrated circuits are created. Inspection of the patterned and unpatterned substrates on which such integrated circuits are fabricated requires unprecedentedly bright broad band light sources in the ultraviolet and visible region in order to provide the sensitivity and throughput that is required by the industry. Thus, there is a continual search for light sources that produce brighter lights at shorter wavelengths.

Light sources that use a plasma that is sustained by a laser can produce the deep ultraviolet radiation that is used for such applications. These light sources operate by focusing a laser into a gas volume, where the laser energy is sufficient to excite the gas into a plasma that emits light. Focusing the laser into the volume is called pumping the plasma, and the laser is often referred to as the pump laser. The pump laser can be continuous, intensity modulated, or pulsed. Such laser-sustained sources exhibit temperatures that are well in excess of those available from electrical discharge-sustained sources. These higher temperatures equate to brighter light sources, and at shorter wavelengths.

While it is relatively simple to sustain a plasma with a light source, such as a laser, it has proved elusive to make the plasma hotter (brighter) using standard laser-sustained techniques. For example, merely increasing the power of the laser tends to make the plasma grow larger, but does not tend to increase the core temperature of the plasma to any appreciable extent.

There is a need, therefore, for light sources that exhibit even higher temperatures.

SUMMARY OF THE CLAIMS

The above and other needs are met by a method of sustaining a plasma, by focusing a first wavelength of electromagnetic radiation into a gas within a volume, where the first wavelength is substantially absorbed by a first species of the gas and excites the first species of the gas into a first region of a plasma having a first size and a first temperature. A second wavelength of electromagnetic radiation is focused into the first region of the plasma, where the second wavelength is different than the first wavelength and is substantially absorbed by a second species of the gas and excites the second species of the gas into a second region of the plasma within the first region of the plasma having a second size that is smaller than the first size and a second temperature that is greater than the first temperature.

In this manner, the relatively colder first plasma region enables the formation of the relatively hotter second plasma region disposed within it.

In various embodiments, the first species of the gas is a relatively lower temperature species of the gas and the second species of the gas is a relatively higher temperature species of the gas. In some embodiments the first species of the gas is gas in an ionization state abundant at a relatively lower temperature and the second species of the gas is gas in an ionization state at a relatively higher temperature. In some embodiments the first species of the gas is gas in an excitation state abundant at a relatively lower temperature and the second species of the gas is gas in an excitation state at a relatively higher temperature. In some embodiments the first species of the gas is free electron gas in a plasma at a relatively lower temperature and the second species of the gas is gas at a relatively higher temperature. In some embodiments the first species of the gas is a first gas and the second species of the gas is a second gas that is different than and mixed with the first gas.

In some embodiments the first wavelength is provided by a first light source and the second wavelength is provided by a second light source that is separate from the first light source. In some embodiments the first wavelength is provided by a first laser and the second wavelength is provided by a second laser that is separate from the first laser. In some embodiments the first wavelength and the second wavelength are both provided by a single light source.

In some embodiments there is an additional step of focusing a third wavelength of electromagnetic radiation into the second plasma region, where the third wavelength is different than both the first wavelength and the second wavelength and is substantially absorbed by a third species of the gas and excites the third species of the gas within the second plasma region into a third plasma region having a third size that is smaller than the second size and a third temperature that is greater than the second temperature.

In some embodiments one or both of the first and second wavelengths are applied in a manner that is one of continuous, modulated, and pulsed.

In some embodiments the first laser is applied only during the plasma ignition time to facilitate absorption of the second laser. In some embodiments the plasma is sustained by the second laser alone. In some embodiments the plasma is sustained by the second laser that is a 532 nanometer laser and the gas volume is xenon at about one atmosphere to three hundred atmospheres.

In some embodiments the first and the second laser is applied only during the plasma ignition time to facilitate absorption of the third laser. In some embodiments the plasma is sustained by the third laser alone.

In some embodiments the second wavelength is within one of the visible spectrum or the ultraviolet spectrum. In some embodiments the first wavelength is in the range from about 360 nanometers to about 560 nanometers and the gas volume is xenon at about one atmosphere to about three hundred atmospheres. In some embodiments the first wavelength is produced with an approximately one micron laser. In some embodiments the first wavelength is produced with a carbon dioxide ten micron laser. In some embodiments the second wavelength is produced with a frequency doubled laser. In some embodiments the first wavelength and the second wavelength are both provided by a single frequency doubled laser.

According to another aspect of the invention there is described an apparatus for producing a plasma, the apparatus having a volume for enclosing a gas, a first electromagnetic radiation source for producing a first beam of electromagnetic radiation at a first wavelength, first optics for focusing the first beam into the gas within the volume, where the first wavelength is substantially absorbed by a first species of the gas and delivers energy into a first region of a plasma having a first size and a first temperature, a second electromagnetic radiation source for producing a second beam of electromagnetic radiation at a second wavelength that is different from the first wavelength, and second optics for focusing the second beam into the first plasma region, where the second wavelength is substantially absorbed by a second species of the gas and delivers energy into a second region of the plasma within the first region of the plasma having a second size that is smaller than the first size and a second temperature that is greater than the first temperature.

According to yet another aspect of the invention there is described an apparatus for producing a plasma, the apparatus having a volume for enclosing a gas, an electromagnetic radiation source for producing a first wavelength of electromagnetic radiation and a second wavelength of electromagnetic radiation that is different from the first wavelength, optics for focusing the first wavelength into the gas within the volume, where the first wavelength is substantially absorbed by a first species of the gas and delivers energy into a first region of a plasma having a first size and a first temperature, and the optics further for focusing the second wavelength into the first plasma region, where the second wavelength is substantially absorbed by a second species of the gas and excites delivers energy into a second plasma region having a second size that is smaller than the first size and a second temperature that is greater than the first temperature.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Various embodiments of the present invention use two or more pumping wavelengths, where each wavelength targets a specific transition point in the energy spectrum of one or more of the gas species used to form the plasma, while avoiding other transition points. For example, one wavelength is selected to create a relatively larger, relatively colder first plasma region, and another wavelength is selected to create a relatively smaller, relatively hotter second plasma region that is contained within the first region.

This method can be expanded with additional wavelengths to enable the formation of successively hotter, more centrally-located regions of the plasma that are nested within successively colder, more peripherally-located regions of the plasma, like a nested shells of plasma regions that are hotter as one moves toward the center, and that are colder as one moves toward the outside edges. In various embodiments the volume in which the plasma is created is formed of one gas or a mixture of gasses. In some embodiments lasers are used to pump the plasma, while in other embodiments other light sources are used to pump the plasma. For convenience, the word "laser" is often used herein, but it is understood that other pumping light sources are contemplated in these and other embodiments.

Overview of Operation

Figure 1:
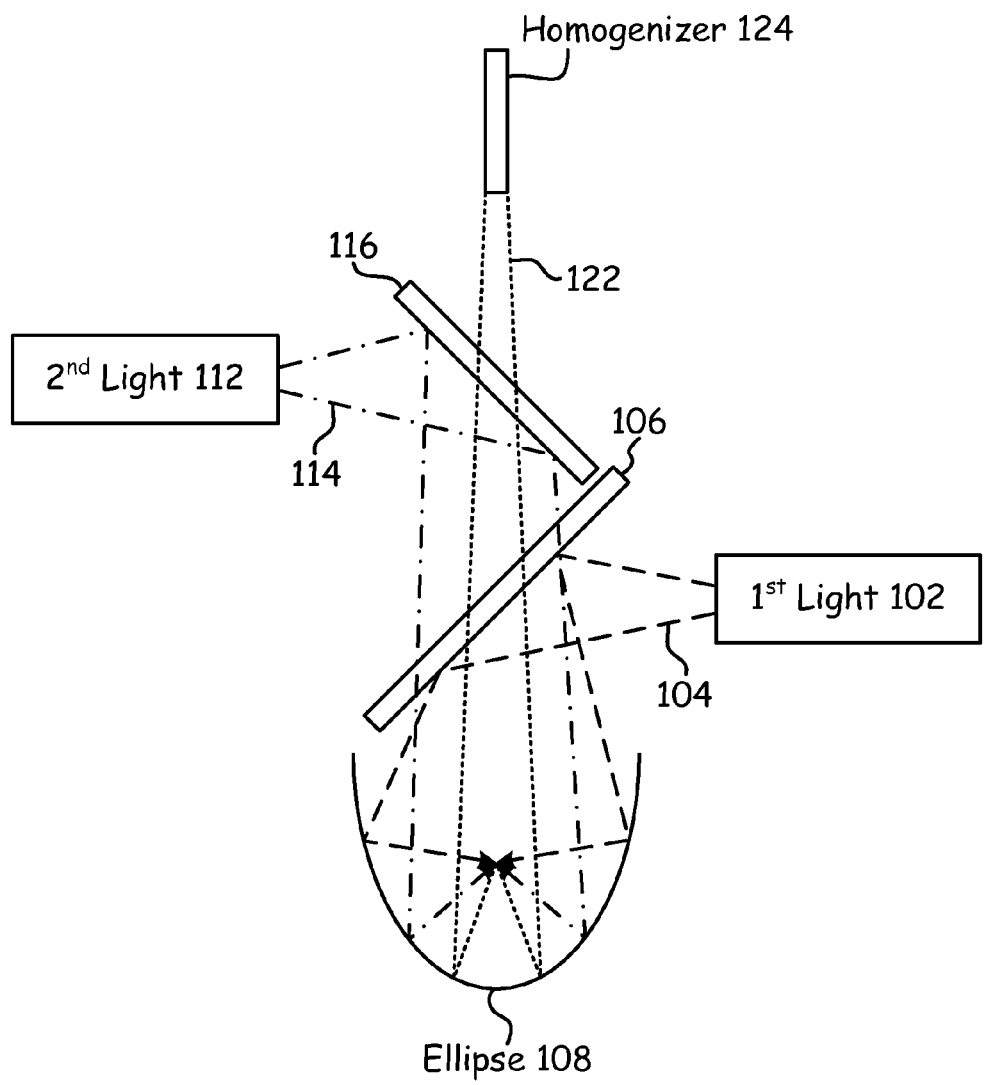
FIG. 1 is a functional block diagram of a light source according to an embodiment of the present invention.

With reference now to FIG. 1 there is depicted a functional block diagram of a light source 100 according to an embodiment of the present invention. A first light 102 produces a first beam 104 that is at least partially reflected off of a first mirror 106 and into an ellipse 108. The first beam 104 has a peak at a first wavelength. In some embodiments, the first beam 104 exhibits energy at substantially only the first wavelength. The ellipse 108 focuses the first beam 104 to the focal point of the ellipse 108. Contained within the ellipse 108 is a volume of one or more gases, and the first beam 104 forms a first, relatively colder region of a plasma from the gas within the volume.

A second light 112 produces a second beam 114 that is at least partially reflected off of a second minor 116 and into the ellipse 108. The second beam 114 has a peak at a second wavelength. The second wavelength is different than the first wavelength. In some embodiments, the second beam 114 exhibits energy at substantially only the second wavelength. The ellipse 108 focuses the second beam 114 to the focal point of the ellipse 108. The second beam 114 forms a second, relatively hotter region of the plasma from the gas within the volume.

It is appreciated that the terms "relatively hotter" and "relatively colder" as used herein do not refer to some external or absolute standard, but are in reference to one another internally, in that one of the plasma regions is hotter in reference to the other, and the other plasma region is colder in reference to the one. Thus, the terms as used herein do not indicate that the plasma regions so designated are any colder or any hotter than a plasma produced by a different apparatus.

The combined light 122 formed by the first region and the second region of the plasma is focused into a homogenizer 124. The combined light 122 is comprised of light of two different color temperatures, a relatively colder (dimmer) light from the first plasma, and a relatively hotter (brighter) light from the second plasma.

As mentioned above, the second region of the plasma is formed, originated, and typically wholly located within boundaries of the first region of the plasma. If only the second beam 114 where to be directed into the volume, the second region of the plasma would either not be able to form or would not be able to reach the relatively hotter temperature. This is so because of a possibility of a few conditions that might be present. For example, the power of the second beam 114 might be too low to ignite and sustain a plasma (alternately said — there might not exist a second light source 112 for the second beam 114 that is powerful enough to sustain on its own a plasma at the given wavelength). Further, the wavelength of the second beam 114 might not absorb sufficiently in the relatively colder gas volume so as to ignite or sustain a plasma.

However, with the first region of the plasma formed, the wavelength and power of the second beam 114 can be selected at a low power that is sufficient to sustain the second region of the plasma within the first region, and at a wavelength that is absorbed preferentially by the hot gas species at the interior of the first and second regions, while being relatively transmissive through the relatively colder gas species of the first region. In this manner, the wavelength of the second beam 114 can be selected to form a hotter second region of the plasma, without being concerned about having a light source 112 that is powerful enough to sustain the plasma on its own—which light source 112 might not even exist. Thus, the second region of the plasma depends upon the formation of the first region of the plasma in which it is confined, in order to exist.

In various embodiments, the light sources 102 and 112 use lasers, while in other embodiments, light sources other than lasers are used. In some embodiments, a single light source is used, but that light source exhibits more than one peak wavelength, where each wavelength produces a different region of the plasma, in the manner as described above. In some embodiments a powerful visible or ultraviolet laser is used as the light source. For example, a green, blue, or ultraviolet 1 laser (direct diode or frequency converted)—for example a frequency doubled Nd:YAG or Nd:YLF laser with a power level in excess of a few hundred watts can be used to provide both wavelengths.

In some embodiments, more than two light sources are used to form more than two regions of the plasma in the volume, or a light source having more than two peak wavelengths is used to form more than two regions of the plasma.

In some embodiments the first laser is applied only during the plasma ignition time to facilitate absorption of the second laser. In some embodiments the plasma is sustained by the second laser alone. In some embodiments the plasma is sustained by the second laser that is in the range from about 360 nanometers to about 560 nanometers and the gas volume is xenon at about one atmosphere to about three hundred atmospheres.

In some embodiments the first and the second laser are applied only during the plasma ignition time to facilitate absorption of the third laser. In some embodiments the plasma is sustained by the third laser alone.

Theory Of Operation

This section extrapolates on theories in regard to the reaction mechanics of the plasma. However, it is appreciated that the embodiments of the invention are not to be limited by such theories, nor is the invention to be discounted in any way if such theories are inaccurate or incomplete.

The characteristics of a plasma that is formed by a given light beam are determined in great measure by the absorption by the gas of the energy of the light beam at a given wavelength of the light beam. Absorption mechanisms include (a) free electron (Bremsstrahlung) absorption, (b) bound electron to free electron absorption, (c) bound electron level transitions, and (d) miscellaneous other mechanisms.

Figure 2:
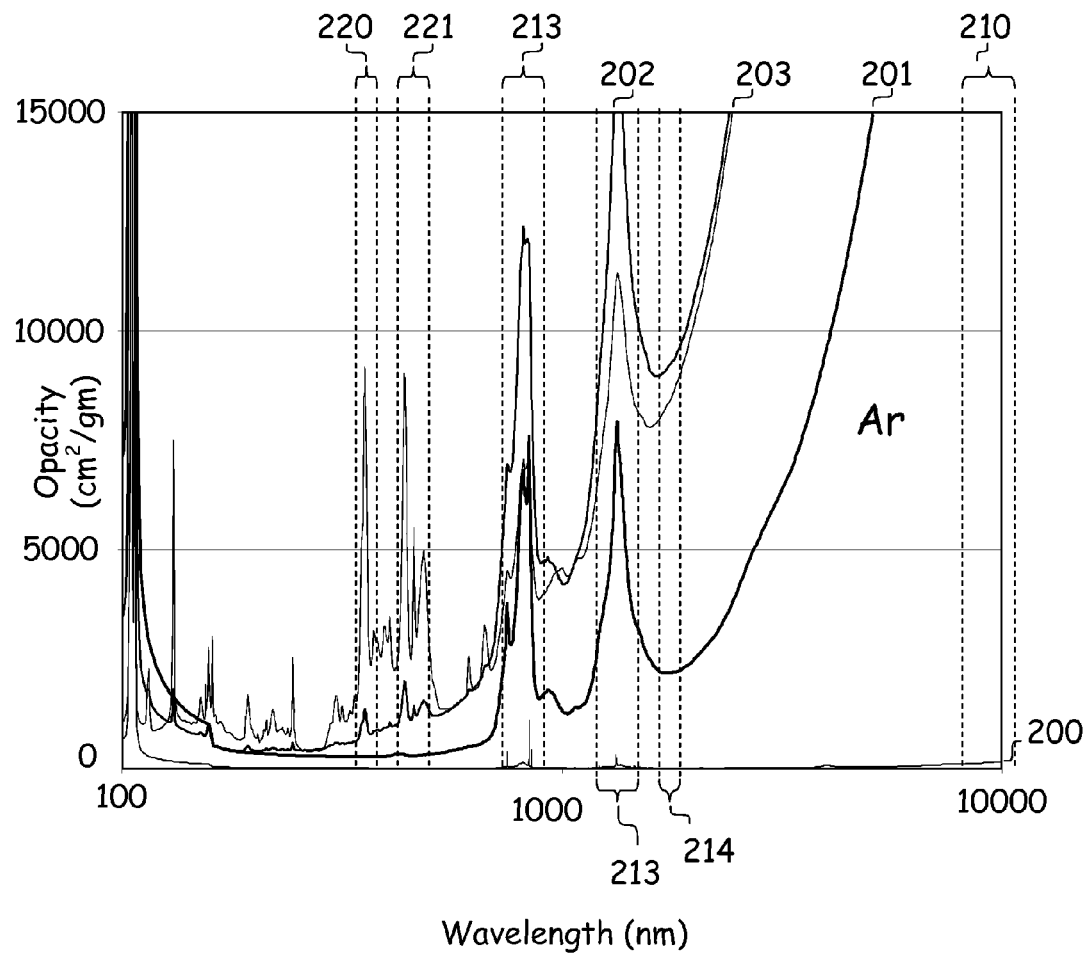
FIG. 2 depicts graphs of the calculated absorption spectra for argon for different plasma temperatures, and at a constant pressure of about seven atmospheres.
Figure 3:
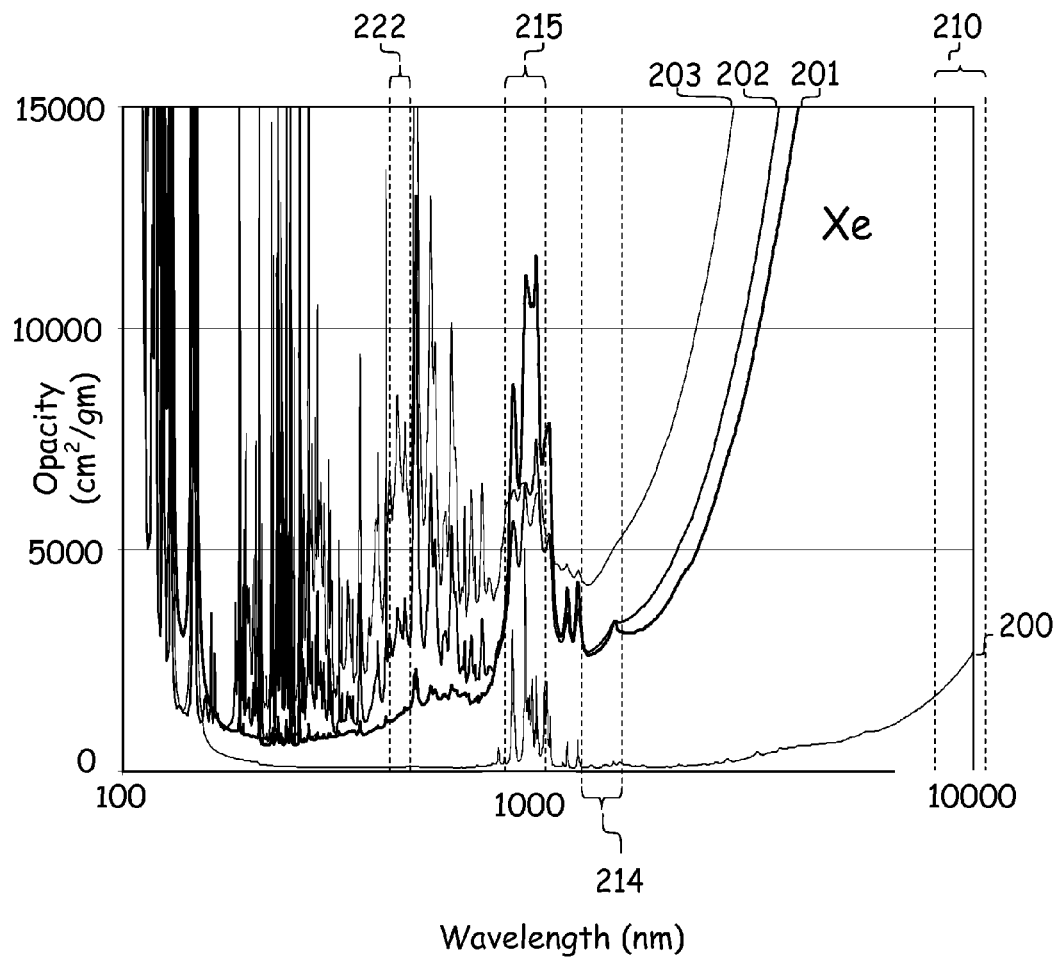
FIG. 3 depicts graphs of the calculated absorption spectra for xenon for different plasma temperatures, and at a constant pressure of about seven atmospheres.

In the contemplated range of pressures and temperatures for a laser sustained plasma, the bound electron level transitions appear to play the dominant role for most of the ultraviolet, visible, and near infrared wavelengths. FIGS. 2 and 3 depict calculated graphs of the absorption spectra for argon (FIG. 2) and xenon (FIG. 3) for different plasma temperatures at a constant pressure (about seven atmospheres). The temperatures plotted are ten thousand Kelvin (indicated at 200), fifteen thousand Kelvin (indicated at 201), twenty thousand Kelvin (indicated at 202), and twenty-five thousand Kelvin (indicated at 203).

Bremsstrahlung absorption appears to dominate for wavelengths greater than about three thousand nanometers. Typically, bound electron level transitions have a structured spectrum. The lines are broadened by different mechanisms (collisional, Doppler, etc.). Bremsstrahlung absorption has a smooth spectrum without spectral features. Bound to free transitions have a structured spectrum with sharp rises at energies corresponding to the onset of ionization. Bounded regions of the graphs represent examples of a possible choice of the wavelengths for a first laser (indicated at 210-215) and a second laser (indicated at 220-222). The first laser is readily absorbed in the relatively colder (ten thousand Kelvin to fifteen thousand Kelvin) plasma region. The relatively colder region of the plasma is substantially transparent to the second laser, which is preferentially absorbed by the relatively hotter (twenty thousand Kelvin to twenty-five thousand Kelvin) plasma region.

By tuning the wavelength, one is able to select what species, if any, in the gas or plasma will absorb the energy of the light beam. For each wavelength, the gas or plasma requires a certain temperature in order to become absorptive. This temperature is generally defined by the bound electron level transition at the lowest transition level. Once the temperature is high enough to populate the lower level, the gas starts absorbing at this transition.

In operation, the first pump beam is focused inside the target gas volume. The plasma is sustained when the power density of the first beam is high enough to compensate for the temperature losses of the plasma. Increasing the intensity of the first beam generates a larger plasma, but not necessarily a hotter plasma. The plasma that is thus created is relatively transparent to a second pump beam wavelength that creates a hotter second plasma region. Thus, it is possible to select a second beam wavelength that is focused inside the sustained first region of the plasma, almost without any losses. Therefore, a second smaller and hotter region of the plasma can be formed inside the first region of the plasma.

There are several mechanisms that tend to explain the reduced energy losses in the hotter region of the plasma when it is situated inside the colder region of the plasma, as opposed to sustaining a hotter plasma in a colder gas. For example, the periphery of the hotter region of the plasma in one case might have a temperature of about one electron volt, while the maximum gas temperature cannot exceed about a tenth of an electron volt because of its contact with the walls of the volume. Thus, a surrounding colder region of the plasma reduces thermal conductivity losses of the hotter region of the plasma by insulating it from the volume boundaries. As another example, the hotter region of the plasma in an ellipse might absorb a substantial portion of the light irradiated by the colder region of the plasma. This enables some indirect pumping of the hotter region of the plasma with the first beam. All of these mechanisms tend to enable the use of a less powerful, more practical light beam to create a hotter and smaller region of the plasma.

If the second laser has enough power to sustain the second region of the plasma without the assistance from the first laser, it can be used alone. According to FIGS. 2 and 3, powerful visible or ultraviolet lasers are beneficial for sustaining a relatively hot plasma. Of particular interest are green, blue, or ultraviolet 1 (direct diode or frequency converted) lasers, such as frequency doubled Nd:YAG lasers, which are commercially available with power levels in excess of a few hundred watts.

Alternate Embodiments

In one embodiment, the second region of the plasma is sustained with a pulsed laser. This second region of the plasma remains small because the pulses of the second laser are relatively short and the second region of the plasma does not have time to grow appreciably. In this embodiment, the first region of the plasma is necessary in order to initiate the second region of the plasma at the beginning of each pulse cycle.

Two or more light sources operating at the same or at different wavelengths can be used for pumping the plasma. The use of one light source is primarily to sustain the outermost region of the plasma, while the other light sources are used to generate hotter, nested regions of the plasma.

One broad-band light source, such as an industrial diode laser, can be used to pump both regions of the plasma. In this case the wavelength band should be wider than the absorption line.

Multiple wavelengths coupled to a single waveguide or fiber can be used to pump both regions of the plasma. Specifically, first and higher harmonics of a frequency converted laser can be used as the pump.

One light source operated in the visible or ultraviolet spectral range can be used to sustain the relatively hotter region of the plasma. Options include diode, fiber, thin disk, ion, or other solid state or free-space lasers that either operate in this wavelength region or are frequency converted to this wavelength region.

The plasma created by one wavelength may be transparent for a wavelength that can pump a hotter region of the plasma. Thus, it is possible to select a second wavelength such that it is focused inside the sustained plasma almost without losses. The second smaller and hotter region of the plasma is sustained inside the first region. Energy losses for the hotter region of the plasma sustained inside the colder region of the plasma are reduced, and thus the plasma temperature can be higher even when pumped by a light source with relatively smaller power.

Different wavelengths can be used to pump the same species, such as different transitions in the same ionic state, or transitions in different ionic states in the plasma.

Continuous frequency-doubled Nd:YAG laser (for example, Trumpf Inc. intracavity doubled thin disk laser) providing the output at 532 nanometer can be used to sustain a very hot plasma in xenon at about one atmosphere to about three hundred atmospheres. Continuous frequency-doubled fiber laser (for example, IPG Photonics, Inc.) providing the output at in the wavelength range from about 500 nanometers to about 560 nanometers can be used to sustain a very hot plasma in xenon at about one atmosphere to three hundred atmospheres.

Different wavelengths can be used to pump different species, such as by pumping a gas mixture. For example, xenon and mercury. The outer region of the plasma is sustained by pumping xenon transitions and the hotter region of the plasma is created by pumping mercury or mercury ions. A longer wavelength light source, such as a carbon dioxide laser, can be used to sustain the plasma through Bremsstrahlung absorption, while a shorter wavelength light source can be used to pump line transitions in the atomic or ionic species.

A continuous power light source can be used for sustaining the exterior region of the plasma, with a pulsed light source used to generate the hotter interior region of the plasma. The secondary pulsed wavelength pumps either ions or hotter atoms. The high power of the secondary light source can be provided with the use of a pulsed fiber, diode, or other (Nd:YAG, Ti:sapphire, etc.) laser. In addition to higher power, the pulsed light source is capable of generating a smaller plasma when the diffusion time of the plasma is longer than the pumping pulse duration. The presence of the colder continuous power plasma allows maintaining an average thermal balance and having enough hot atoms and ions for the secondary wavelength pumping initialization at the beginning of each pulse.

EXAMPLE

The proposed system can be implemented with an intracavity frequency doubled continuous power laser, such as manufactured by IPG Photonics or Trumpf. The one micron fundamental wavelength of these lasers is used to sustain the lower-temperature region of the plasma, and the half-micron second harmonic is used to pump the hotter plasma region inside the first region.

Another example is an argon plasma with separate argon ion pumping by a second light source. An argon volume can be effectively pumped with a near infrared laser. The plasma in the argon volume is sustained with a 978 nanometer eight hundred watt LaserLine diode laser. The first region of the plasma that is generated is mostly transparent for near infrared and visible light. This enables generating a relatively smaller, hotter second region of the plasma by pumping only the argon ions with a 514 nanometer argon ion laser (available up to ten watts continuous power). The argon laser can be focused within a very small spot (such as less than one micron), which creates a relatively hotter second region of the plasma.

An alternate for the argon laser second light source is a dual-wavelength near infrared laser. In this example, an argon plasma is pumped with a 975 nanometer or a 978 nanometer laser. This generates a low temperature first plasma, using no more than about an eight hundred watt laser. However, eight hundred watts was found to not be sufficient for sustaining at argon plasma at other wavelengths. Once the first plasma is sustained, additional levels can be pumped with an additional laser. For a diode laser, options include a 1068 nanometer fiber laser, or lasers operating at 957 nanometers or 975 nanometers. One embodiment uses a dual-wavelength laser such as a high-power (greater than one kilowatt) LaserLine Inc. laser. Both pumping wavelengths in this case use the same laser and optics.

Selection of Wavelengths

In one embodiment there is a design goal to match the second wavelength to level transitions in the gas volume such that the second beam is efficiently absorbed by the central part of the first plasma, while the outer parts of the first plasma are relatively transparent to the second wavelength. This can be done by tuning the wavelength to the (multiple) ion absorption line or to a line of absorption of highly excited neutral species of the gas(es), while simultaneously avoiding strong absorption features of colder species.

Similarly, the wavelength bandwidth can be chosen to match or be narrower than the absorption line width of the (multiple) ion species or highly excited neutral species. One example of such a choice is a 964 nanometer second light for mercury gas. The first ion of mercury absorbs 964 nanometer light on an excited transition, whereas there is no absorption of 964 nanometer light in atomic mercury.

A plasma was not sustainable in a ten atmosphere argon bulb with an eight hundred watt infrared laser until the wavelength was tuned to the 978 nanometer transition of the highly excited argon atom. The colder parts of the plasma did not have enough population of the excited states to absorb this light in the outer regions of the plasma.

Plasma operation (collectable ultraviolet power and temperature) was shown to strongly depend on the laser wavelength for xenon, with the preferred operation regime possible when avoiding the absorption line at 982 nanometers. Originating from a lower-excited state of the xenon gas, this line is absorbing in the outer regions of the plasma, resulting in poorer performance (larger, less efficiently pumped).

By displaying the transition wavelength as a function of the energy of the level on which the transition originates, one can make an informed decision as to which frequency to use, as depicted in FIGS. 2 and 3.

The foregoing description of embodiments for this invention has been presented for purposes of illustration and description. It is not intended to be exhaustive or to limit the invention to the precise form disclosed. Obvious modifications or variations are possible in light of the above teachings. The embodiments are chosen and described in an effort to provide illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method of sustaining a plasma, the method comprising the steps of:
focusing a first wavelength of electromagnetic radiation into a gas within a volume, where the first wavelength is substantially absorbed by a first species of the gas and delivers energy into a first region of a plasma having a first size and a first temperature, and
focusing a second wavelength of electromagnetic radiation into the first region of the plasma, where the second wavelength is different than the first wavelength and is substantially absorbed by a second species of the gas and delivers energy into a second region of the plasma within the first region of the plasma having a second size that is smaller than the first size and a second temperature that is greater than the first temperature.

2. The method of claim 1, wherein the first species of the gas comprises a relatively lower temperature species of the gas and the second species of the gas comprises a relatively higher temperature species of the gas.

3. The method of claim 1, wherein the first species of the gas comprises a first gas and the second species of the gas comprises a second gas that is different than and mixed with the first gas.

4. The method of claim 1, wherein the first wavelength is provided by a first light source and the second wavelength is provided by a second light source that is separate from the first light source.

5. The method of claim 1, wherein the first wavelength is provided by a first laser and the second wavelength is provided by a second laser that is separate from the first laser.

6. The method of claim 1, wherein the first wavelength and the second wavelength are both provided by a single light source.

7. The method of claim 1, further comprising the step of focusing a third wavelength of electromagnetic radiation into the second region of the plasma, where the third wavelength is different than both the first wavelength and the second wavelength and is substantially absorbed by a third species of the gas and delivers energy into a third region of the plasma within the second region of the plasma having a third size that is smaller than the second size and a third temperature that is greater than the second temperature.

8. The method of claim 1, wherein the first wavelength is applied in a manner that is one of continuous, modulated, and pulsed, and the second wavelength is applied in a manner that is one of continuous, modulated, and pulsed.

9. The method of claim 1, wherein the second wavelength is within one of the visible spectrum and the ultraviolet spectrum.

10. The method of claim 1, wherein the first wavelength is produced with at least one of a one micron laser and a ten micron laser.

11. The method of claim 1, wherein the first wavelength is about 532 nanometers and the gas volume includes xenon at a pressure of from about one atmosphere to about three hundred atmospheres.

12. The method of claim 1, wherein the first wavelength is a produced by a fundamental output of a laser and the second wavelength is produced by a frequency-doubled portion of the first wavelength from the laser.

13. The method of claim 1, wherein the second wavelength is selected from one of the visible spectrum and the ultraviolet spectrum, the second wavelength is substantially absorbed by the second species only at a temperature that is no less than the first temperature, and the step of focusing the first wavelength into the volume is halted once the first temperature is attained.

14. The method of claim 1, wherein the second wavelength is selected from one of the visible spectrum and the ultraviolet spectrum and is applied continuously and the first wavelength is applied only for the initial ignition of the hot plasma.

15. The method of claim 1, wherein the only the second wavelength is continuously applied to sustain the hot plasma and the second wavelength is selected from one of the visible spectrum and the ultraviolet spectrum.

16. An apparatus for producing a plasma, comprising:
a volume for enclosing a gas,
a first electromagnetic radiation source for producing a first beam of electromagnetic radiation at a first wavelength,
first optics for focusing the first beam into the gas within the volume, where the first wavelength is substantially absorbed by a first species of the gas and delivers energy into a first region of a plasma having a first size and a first temperature,
a second electromagnetic radiation source for producing a second beam of electromagnetic radiation at a second wavelength that is different from the first wavelength, and
second optics for focusing the second beam into the first region of the plasma, where the second wavelength is substantially absorbed by a second species of the gas and delivers energy into a second region of the plasma within the first region of the plasma having a second size that is smaller than the first size and a second temperature that is greater than the first temperature.

17. The apparatus of claim 16, wherein the first species of the gas comprises a relatively lower temperature species of the gas and the second species of the gas comprises a relatively higher temperature species of the gas.

18. The apparatus of claim 16, wherein the first species of the gas comprises a first gas and the second species of the gas comprises a second gas that is different than and mixed with the first gas.

19. An apparatus for producing a plasma, comprising:
a volume for enclosing a gas,
an electromagnetic radiation source for producing a first wavelength of electromagnetic radiation and a second wavelength of electromagnetic radiation that is different from the first wavelength,
optics for focusing the first wavelength into the gas within the volume, where the first wavelength is substantially absorbed by a first species of the gas and delivers energy into a first region of a plasma having a first size and a first temperature, and
the optics further for focusing the second wavelength into the first region of the plasma, where the second wavelength is substantially absorbed by a second species of the gas and delivers energy into a second region of the plasma within the first region of the plasma having a second size that is smaller than the first size and a second temperature that is greater than the first temperature.

* * * * *